INVENTOR.
EARL J. VALLEN.
BY Ely & Barrow
ATTORNEYS

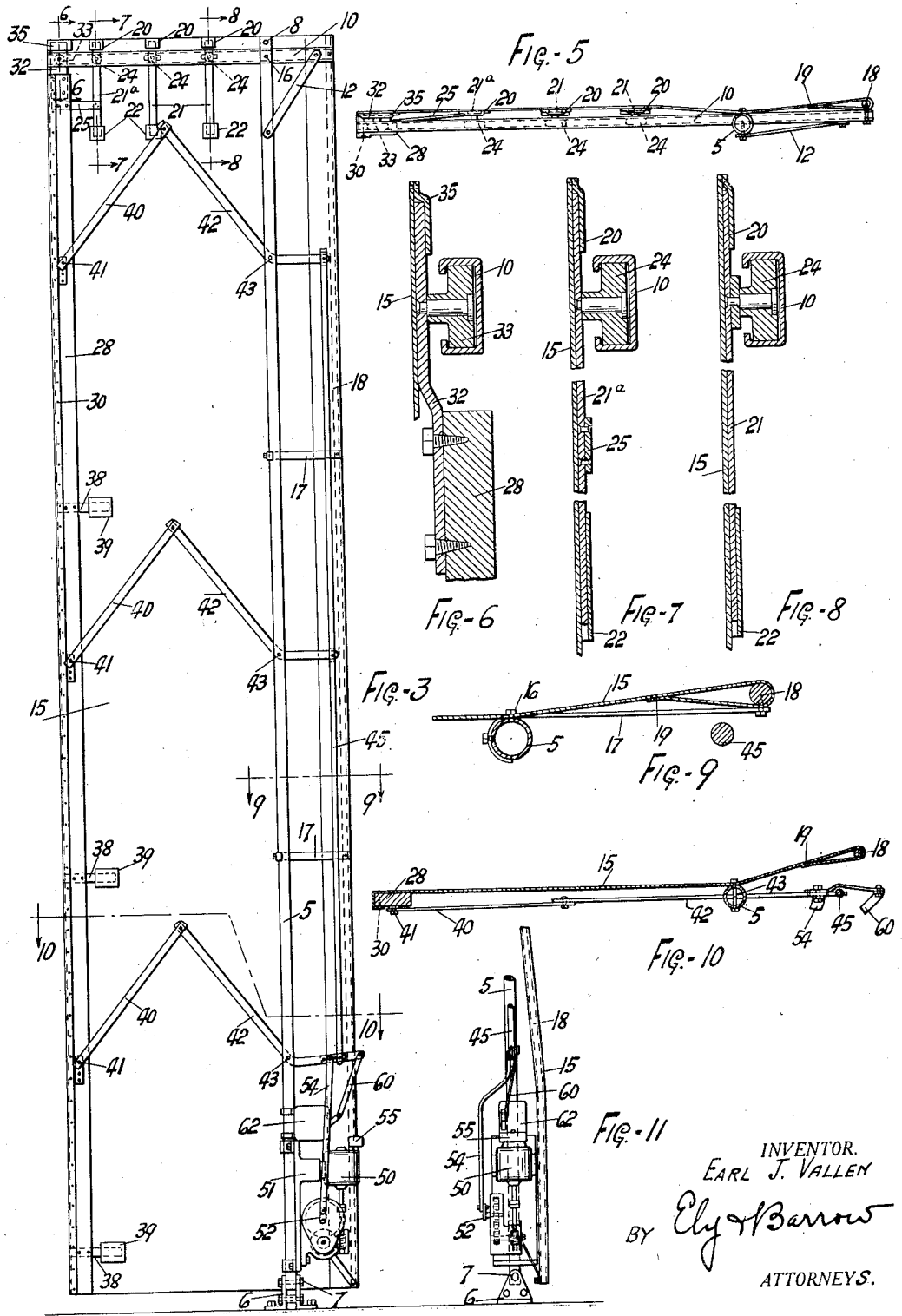

Patented Apr. 18, 1933

1,904,963

UNITED STATES PATENT OFFICE

EARL J. VALLEN, OF AKRON, OHIO

MASK FOR MOVING PICTURE SCREENS

Application filed July 12, 1929. Serial No. 377,700.

The present invention relates to the art of projection and reproduction of motion pictures and particularly to the showing of pictures which are produced in conjunction with sound.

In the production of the usual or popular motion pictures with sound or dialogue, known as the "talkies," the sound wave or sound control is carried upon the margin of the film so that the sounds are properly synchronized with the projection of the picture. The provision of the sound feature in the film necessarily narrows that portion of the film which is devoted to the picture, and in displaying the picture it is customary to provide a slide or aperture plate in the projection apparatus to cover the portion of the film devoted to the sound. This operation necessarily reduces the projected area of the film, which will leave an area upon the screen which shows objectionably unless means are adopted to correct the conditions.

Prior to the adoption of the present invention, the usual custom in changing over to the sound pictures from silent pictures was, in conjunction with the movement of the shutter over the margin of the film, to change the lens in the projector to one which would distort the picture sufficiently to cause it to fill the entire screen area. The resulting distortion of the picture was objectionable and changing the lens in going from silent to sound pictures and reverse delayed the operation of the projecting apparatus.

It is the object and purpose of the present invention to devise and construct an apparatus which can be readily and easily operated to reduce the area of the screen when sound pictures are to be reproduced, or to enlarge the same in showing the silent pictures, whereby the area of the screen will be brought into conformity with the area of the picture to be reproduced and distortion of the picture is avoided.

The device may also be used to reduce the screen area for other purposes and the apparatus may be duplicated on both sides of the screen or at the top and bottom, depending upon the demands of the operator.

The invention comprises a movable mask or shield which is placed in front and at one side of the screen, and which is adapted to be moved over the screen to reduce the area thereof conforming to the reduced picture. The apparatus may be operated by hand or may have associated with it mechanism by which the movement thereof can be controlled by the operator at the projector.

It is believed that the present invention is the first apparatus of its type and kind and the invention is not limited to exact conformity with the details of the invention as shown and described, but changes and modifications may be made in specific embodiments of the invention.

In the drawings in which the best known and preferred form of the apparatus is shown, Figure 1 is a front elevation of a portion of a moving picture screen showing the mask or shield in withdrawn position exposing the entire area of the screen;

Figure 3 is a view looking at the rear side of the mask showing the operating mechanism;

Figure 4 is an enlarged horizontal section on the line 4—4 of Figure 1;

Figure 5 is an enlarged plan view;

Figure 6 is a section on the line 6—6 of Figure 3;

Figure 7 is a section on the line 7—7 of Figure 3;

Figure 8 is a section on the line 8—8 of Figure 3;

Figure 9 is a section on the line 9—9 of Figure 3;

Figure 10 is a section on the line 10—10 of Figure 3; and

Figure 11 is an end view of the power device for operating the mask.

Figure 1:
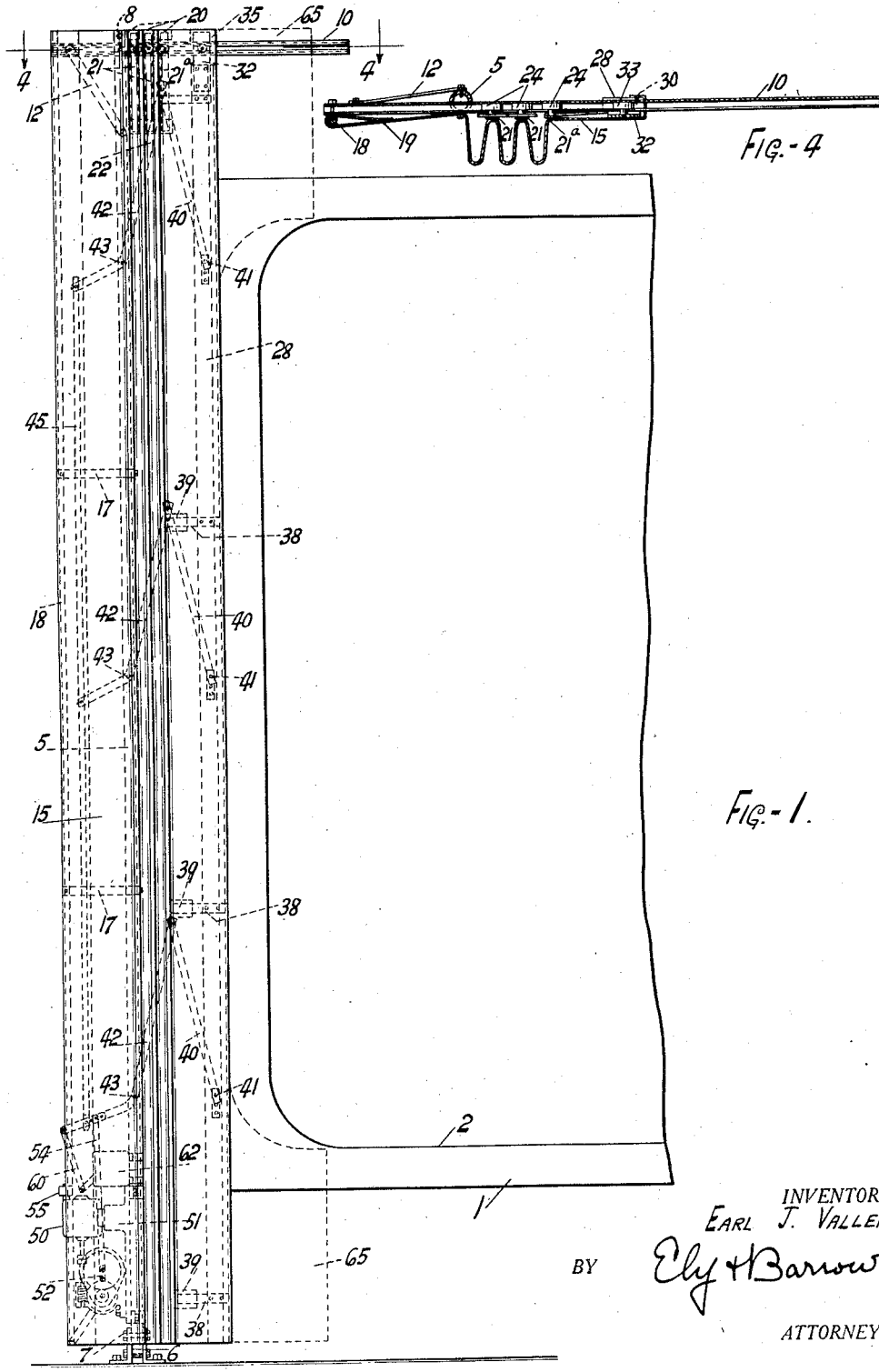
Figure 2:
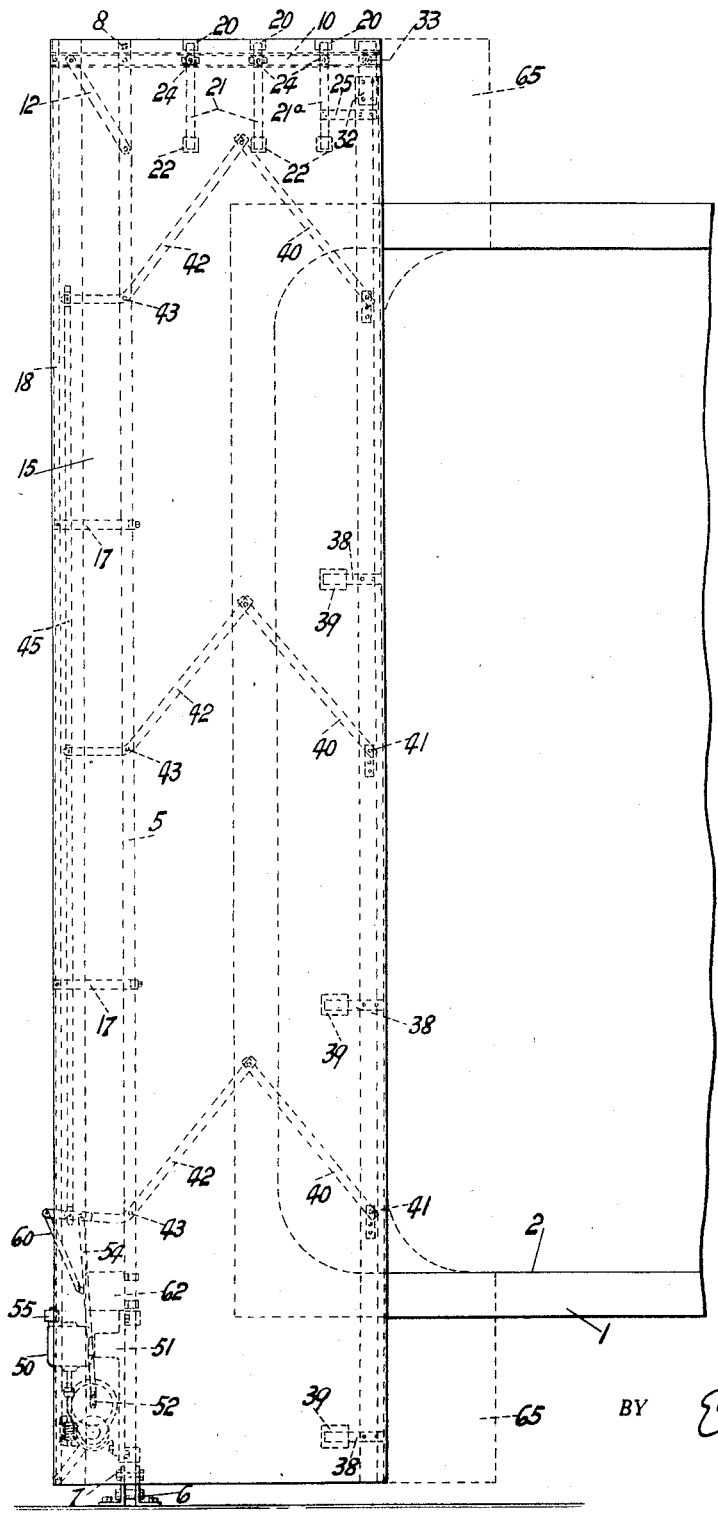
Figure 2 is a similar view showing the mask projected or in open position as in the display of sound pictures.

The moving picture screen is indicated by the numeral 1, the projection area of the screen being surrounded by the border denoted by the line 2. As shown, this area is made with the rounded corners and the mask is shown as adapted for this type of screen.

The margin of the film which is devoted to the sound feature is usually located at the right of the film so that that area or margin is on the left of the screen, and the mask is therefore located on the left side of the screen as shown, although other locations for the mask may be utilized.

The apparatus is supported upon an upright 5, preferably a steel tubing which is mounted in a base 6. The tubing is mounted in its support for pivotal adjustment about the bolt 7 so that the angle of the upright can be determined to accommodate the screen. The upper end of the upright is provided with a hole 8 to which a cable may be attached. Fastened near the top of the upright is the horizontal flanged rail 10 supported and braced as at 12 and which supports and guides the movable mask.

The mask as a whole is indicated by the numeral 15. It is made of a heavy black cloth or similar material adapted to match with the area surrounding the screen and to be indistinguishable from the border surrounding the area 2. It is fixed to the upright at the spaced points 16 and at its inner edge or that portion remote from the screen it is folded and stitched at 19 along the edge of the mask over a vertical rod 18, which latter is attached to the upright 5 by brackets 17 located at intervals along the upright. Along its upper edge the mask is provided with a series of pockets 20 in which are received the upper ends of the vertical bars 21. At the lower ends of the bars 21 are located pockets 22 which hold the mask against the bars. The bars 21 are provided with rollers 24 which are received in the rails 10.

The bar 21ª located nearest to the outer edge of the mask is fixed while the other bars are movable along the rail. The bar 21ª is attached to a cross bar 25, the other end of which is secured to a wooden edge post 28 which extends along the outer edge of the masks and to which the mask is fastened by tacks or the like as shown at 30. The upper end of the post 28 is attached to a vertical hanger 32 on which is mounted the roller 33, similar to the roller 24. A pocket 35 at the corner of the mask is received over the upper end of the hanger 32. Horizontal brackets 38 located at intervals along the post 28 extend inwardly with their ends approximately in alignment with the bar 21ª, the ends of the brackets being received in the pockets 39 on the rear of the mask.

It will be seen that the outer edge portion of the mask is maintained in its flattened or smooth condition to a line extending inwardly of the mask which is approximately that portion of the mask which projects over the screen when the mask is extended. By this construction the portion of the mask which is exposed to view at the edge of the screen is unwrinkled.

The mask is contracted or expanded by means of a plurality of toggles composed of links 40 pivoted at 41 at spaced intervals on the post 28 and to links 42 which are pivoted at 43 to the upright 5. The links 42 are extended inwardly and pivoted to a vertical equalizing bar 45.

The mask may be operated by hand to project and retract the margin or edge thereof relative to the screen, but it may be desirable to provide motor operated mechanism which may be controlled by the moving picture operator. For this purpose a motor 50 is provided supported on a bracket 51 attached to the lower end of the upright 5. The motor, through the requisite gearing as shown in Figure 3, drives the crank 52 which is connected by the link 54 with the lowermost toggle. A button switch 55 for controlling the motor is shown and of course this may be located at any point and additional button switches may be situated wherever desired. To the lowermost link 42 may be attached the connecting link 60 which operates an automatic switch 62 to stop the movement of the mask at its inner and outermost positions.

What is claimed is:—

1. A device for reducing the projection area of a moving picture screen to compensate for the difference in the location or extent of sound and silent pictures upon the screen, said device comprising a horizontal rail, carriers movable over the rail, and a curtain suspended therefrom, the forward edge of the curtain being provided with means to keep the same smooth and unwrinkled, said means including a rigid vertical batten and a plurality of spaced levers connected to said batten and so constructed and arranged as to effect lateral movement of the latter.

2. A device for the uses and purposes set forth, comprising a moving picture screen, an upright at one side of the screen, a horizontal rail thereon, a curtain suspended from the rail, a rigid vertical member in the outer edge of the curtain, and means for expanding or contracting the curtain to move the outer edge over the screen, said means including a plurality of levers connecting said upright and said vertical member at spaced intervals to mechanism for operating the levers.

3. A device for the uses and purposes set forth, comprising a moving picture screen, an upright at one side of the screen, a horizontal rail thereon, a curtain suspended from the rail, a rigid vertical member in the outer edge of the curtain, short bars projecting laterally from the vertical member to maintain the curtain locally unwrinkled adjacent the vertical member, and means engaging the vertical member at a plurality of points longitudinally thereof for expanding or contracting the curtain to move the outer edge over the screen.

4. A screen modifier comprising an upright, a horizontal track secured to the top of said upright, a masking curtain, a plurality of rollers running in said track supporting the top of said masking curtain, vertical battens secured to the sides of the curtain, clamps securing one of the battens in fixed parallel relationship with the upright, a plurality of levers pivotally secured, at spaced intervals, to said upright, links securing said levers to the other of the vertical battens, and means for simultaneously operating all of said levers, said means including an electric motor and switch mechanism for automatically stopping said motor at the masking or non-masking positions of the curtain.

5. A screen modifier comprising an upright, a horizontal track secured to the top of said upright, a masking curtain, a plurality of rollers running in said track supporting the top of said masking curtain, vertical battens secured to the sides of the curtain, clamps securing one of the battens in fixed parallel relationship with the upright, a plurality of levers pivotally secured, at spaced intervals, to said upright, links securing said levers to the other of the vertical battens, and means for simultaneously operating all of said levers.

6. A screen modifier comprising an upright, a masking curtain, vertical battens secured to the sides of the curtain, clamps securing one of the battens in fixed parallel relationship with the upright, a plurality of levers pivotally secured, at spaced intervals, to said upright, links securing said levers to the other of the vertical battens, and means for simultaneously operating all of said levers.

7. A screen modifier comprising an upright, a horizontal track secured to the top of said upright, a masking curtain, a plurality of rollers running in said track supporting the top of said masking curtain, a vertical batten secured to the sides of the curtain, a plurality of levers pivotally secured, at spaced intervals, to said upright, links securing said levers to the vertical batten, and means for simultaneously operating all of said levers.

8. A device for the uses and purposes set forth comprising a motion picture screen, a horizontal rail adjacent one side thereof, a curtain suspended from the rail, a rigid vertical member in the outer edge of the curtain, bars engaging a substantial upper marginal region of the curtain to maintain the curtain locally unwrinkled adjacent the horizontal rail, and wheels journaled on said bars and serving to slidably carry the bars and curtain on said rail.

EARL J. VALLEN.